Sept. 21, 1965  D. E. COMIRE  3,206,843
DEVICE FOR INSERTING A CUTTING BLADE IN A TOOL SOCKET
Filed March 21, 1963

INVENTOR.
Donald E. Comire
BY
Roberts, Cushman & Grover
ATT'YS

United States Patent Office 3,206,843
Patented Sept. 21, 1965

3,206,843
DEVICE FOR INSERTING A CUTTING BLADE IN A TOOL SOCKET
Donald E. Comire, Milford, N.H., assignor to The O.K. Tool Company, Inc., Milford, N.H., a corporation of New Hampshire
Filed Mar. 21, 1963, Ser. No. 266,876
1 Claim. (Cl. 29—275)

In metal cutting tools it is customary to provide a rotary head with tapered sockets in its periphery and tapered blades which wedge in the sockets in response to driving blows on the outer ends of the blades with a hand hammer or light air hammer. In this driving process there is danger of dulling the cutting edge on the outer end of the blade, and in the case of carbide tipped blades there is danger of chipping the cutting edge. Inasmuch as the outer end of the blade is beveled to provide rake clearance the hammer also tends to skid off the blade.

Objects of the invention are to provide a driver for inserting blades without damaging the cutting edges and without danger of the aforesaid skidding.

According to the present invention the driver has a recess in one end to receive the cutting edge of the blade and a surface inclined at the same angle as said beveled end to seat flatwise thereon, the face of the recess opposite said surface abutting the forward side of the blade to prevent the driver from skidding off the beveled end of the blade, whereby a blade may be driven into a socket without exerting driving force on the cutting edge of the blade. Preferably the aforesaid face is formed of soft material so as not to dull the cutting edge on accidental contact therewith. In a more specific aspect the aforesaid recess comprises a deep part to receive the cutting edge of the blade and a shallow part to seat on said beveled end, the shallow part being inclined at the same angle as said beveled end so as to seat flatwise thereon, and the face of said deep part opposite the shallow part extends beyond the shallow part to abut the forward side of the blade and prevent the driver from skidding off the beveled end of the blade. In the preferred embodiment the aforesaid face is formed of soft material so as not to dull the cutting edge on accidental contact therewith.

For the purpose of illustration a typical embodiment is shown in the accompanying drawings in which—

Figure 1:
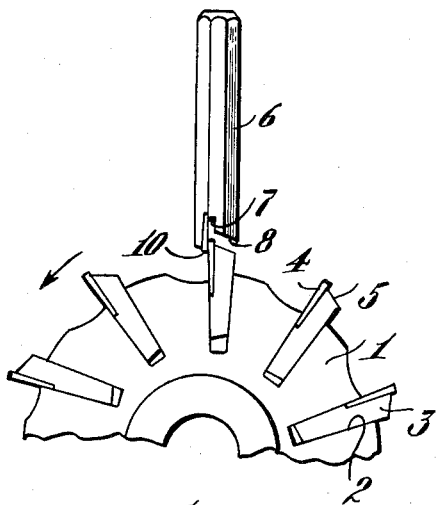
FIG. 1 is a side view of a cutting tool with the driver partially applied to one of the blades.
Figure 2:
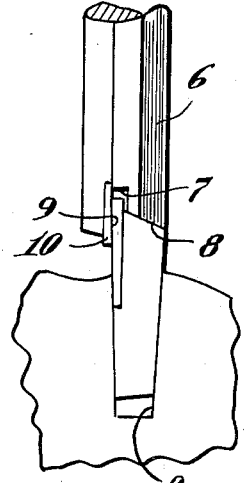
FIG. 2 is an enlarged view of the driver fully applied ready for driving.
Figure 3:
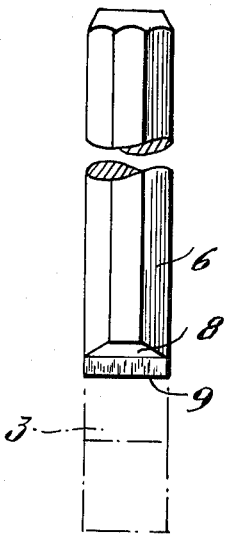
FIG. 3 is a side view of the driver.
Figure 4:
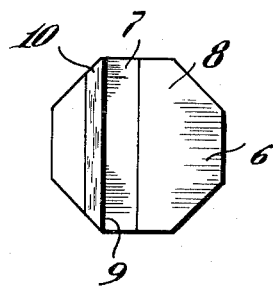
FIG. 4 is an end view of the driver.

In the illustration the cutting tool comprises a rotary head 1 having tapered recesses 2 in its periphery and tapered blades 3 fitting the recesses. In use the head rotates in the direction of the arrow in FIG. 1. Usually the rear faces of the blades and the abutting faces of the recesses have serrations extending radially to prevent slippage of the blades axially of the tool. As shown in FIGS. 1 and 2 the blades have carbide tips 4 and their outer ends 5 are beveled to provide rake clearance.

According to this invention the driver 6 has a recess 7–8 in its forward end, the recess comprising a deep part 7 to receive the tip of the blade and an inclined shallow part 8 to seat on the beveled end of a blade. The face 9 of the deep part 7 opposite the shallow part 8 extends beyond the shallow part to abut the forward face of a blade and thereby prevent the driver from skidding off the beveled end of the blade. The face 9 is preferably an insert 10 of soft material which is brazed or otherwise secured to the driver. As shown in FIG. 2 the deep part 7 of the recess is preferably wider than the thickness of the tip 4 so that, with the forward side of the tip bearing on the face 9 as shown in FIG. 2, the cutting edge of the blade bears only on soft material.

After the driver has been placed in the position shown in FIG. 2 it is tapped on its upper end to wedge the blade in the recess.

It should be understood that the present disclosure is for the purpose of illustration only and that this invention includes all modifications and equivalents which fall within the scope of the appended claim.

I claim:

A driver for inserting in a socket a blade having a beveled end to provide rake clearance from its cutting edge, the driver having a recess in one end to receive the cutting end of the blade, the recess including a deep part to receive the cutting edge and an inclined shallow part to seat flatwise on said beveled end, and an insert of soft material secured to the driver in said deep part on the side abutting the forward side of the blade to prevent the driver from skidding off the beveled end of the blade, whereby a blade may be driven into a socket without dulling said cutting edge.

References Cited by the Examiner
UNITED STATES PATENTS

| 1,344,619 | 6/20 | Colvin | 29—278 X |
| 1,864,405 | 6/32 | Brewer | 29—275 |
| 1,984,748 | 12/34 | Knutson | 29—278 X |
| 2,272,355 | 2/42 | Schnell | 81—52.35 X |
| 2,736,953 | 3/56 | Kimes | 29—225 |

WILLIAM FELDMAN, *Primary Examiner.*

MYRON C. KRUSE, M. HENSON WOOD, JR.,
*Examiners.*